Feb. 8, 1949. P. H. PALEN 2,461,001
TORQUE METER
Filed Oct. 6, 1945 2 Sheets-Sheet 1

INVENTOR.
PETER H. PALEN.
BY
ATTORNEY

Feb. 8, 1949.  P. H. PALEN  2,461,001
TORQUE METER
Filed Oct. 6, 1945  2 Sheets—Sheet 2
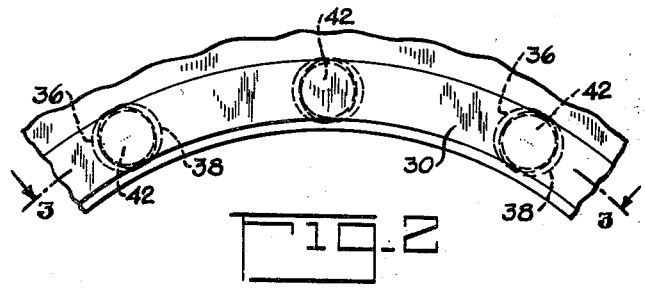
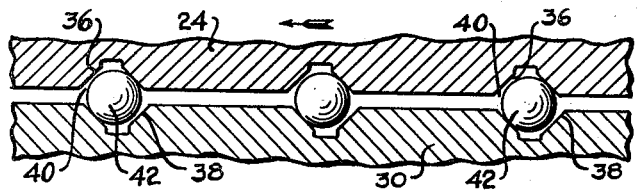
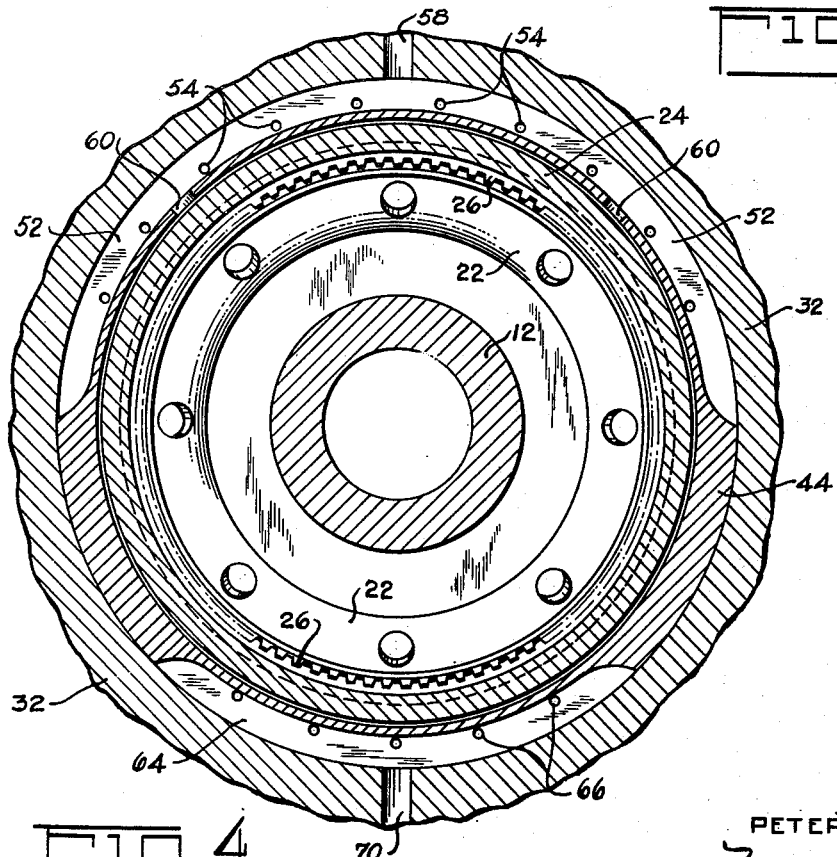
INVENTOR.
PETER H. PALEN.
BY
ATTORNEY Patented Feb. 8, 1949

2,461,001

UNITED STATES PATENT OFFICE 2,461,001

TORQUE METER

Peter H. Palen, Paterson, N. J., assignor to Wright Aeronautical Corporation, a corporation of New York Application October 6, 1945, Serial No. 620,719

4 Claims. (Cl. 73—136)

This invention relates to hydraulic force-measuring means and is particularly directed to improvements in torque measuring means in which the magnitude of a fluid pressure is automatically controlled by the torque to be measured—for example, as disclosed in Patent No. 2,289,285 to Roland Chilton and in Patent No. 2,233,498 to E. Taylor.

In the prior art torque meters, a piston is movable against a pump outlet fluid pressure with a force proportional to the torque to be measured and the piston controls a fluid bleed passage in such a manner that the fluid pressure balances this force. In the prior art torque meters, the measured fluid pressure varies with pulsations characteristic of the pump output pressure. Also torsional vibrations of the transmission are transmitted to the torque meter piston whereby the measured fluid pressure also varies with these vibrations. In addition, the measured torque meter pressure is subject to pressure fluctuations resulting from rapid changes in flow through the torque meter bleed passage. It is an object of this invention to provide a new and improved hydraulic torque meter in which these pressure fluctuations are not transmitted to and indicated by the torque meter.

Other objects of this invention will become apparent upon reading the annexed detailed description in connection with the drawing in which:

Figure 2 is a view taken along line 2—2 of Figure 1;

Figure 3 is a sectional view taken along line 3—3 of Figure 2; and

Figure 4 is a sectional view taken along line 4—4 of Figure 1.

Figure 1:
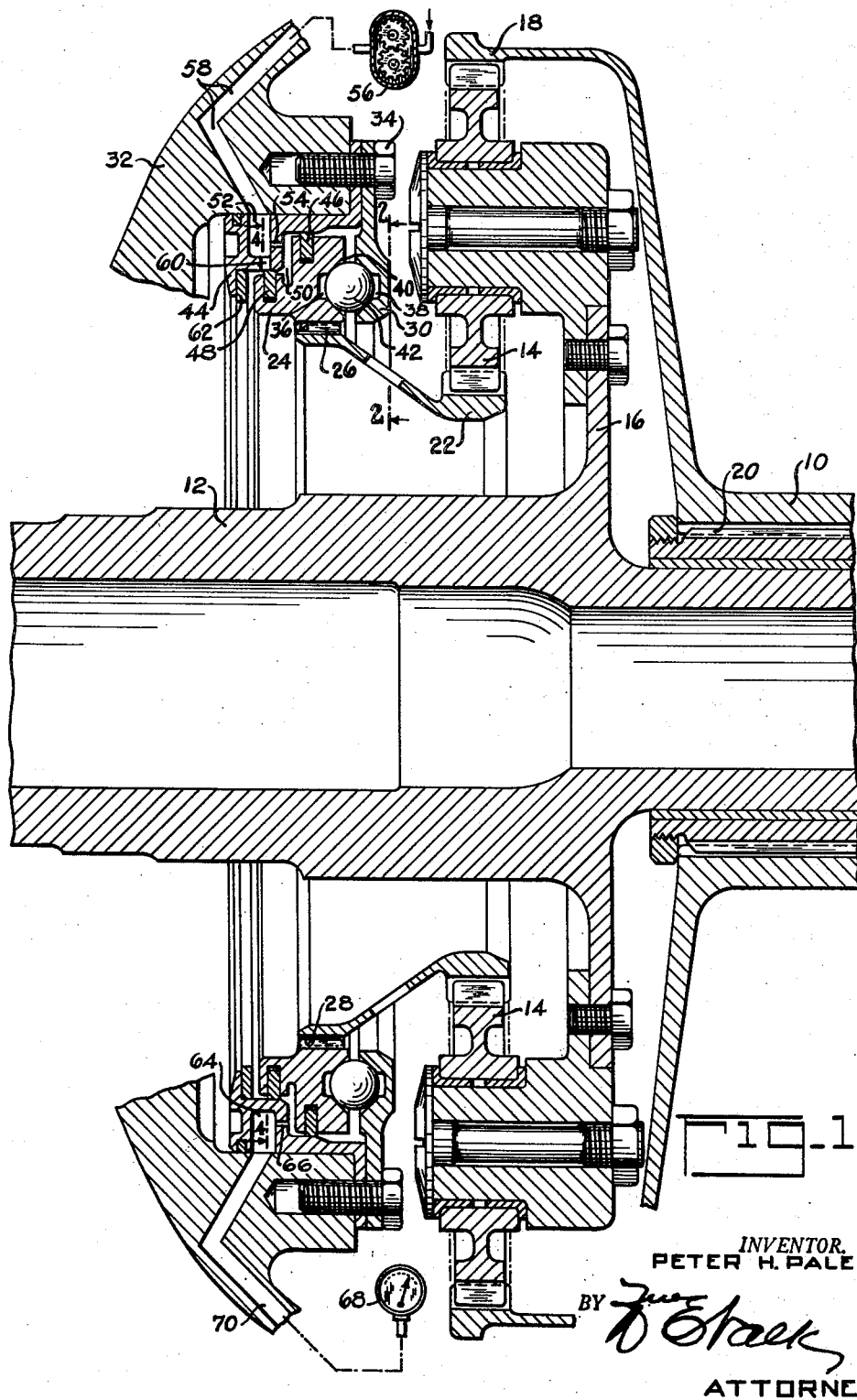
Figure 1 is an axial section through a torque meter embodying the invention.

Referring to the drawing, reference numeral 10 designates a shaft which, as illustrated, comprises the forward end of an aircraft engine crankshaft. A propeller shaft 12 is drivably connected to the crankshaft 10 by means of planetary gearing comprising a plurality of circumferentially spaced planet pinions 14 carried by a spider 16 rigid with the propeller shaft 12. The planet pinions 14 are disposed in meshing engagement between an internal gear 18, splined to the crankshaft 10 at 20, and a sun or reaction gear 22 concentric with said internal gear 18. Instead of securing the reaction gear 22 directly to a fixed housing or crankcase 32, there is interposed therebetween a torque responsive mechanism comprising an annular piston 24 splined to the reaction gear 22 at 26. A locking ring 28 may be provided to prevent relative axial movement between the reaction gear 22 and piston 24. A fixed annular member 30 is rigidly secured to the housing 32 by screws 34. The piston is provided with a plurality of circumferentially spaced conical recesses 36 facing similar recesses 38 in the fixed member 30 and defining pockets 40 therebetween. A spherical ball 42 is disposed within each of the pockets 40.

The piston 24 is axially slidable along a second annular member 44 rigidly secured to the housing 32 by screws 34. Seal rings 46 and 48 are provided between the piston 24 and the annular member 44 to form a sealed annular space or hydraulic cell 50 to which a hydraulic fluid is supplied under pressure for action against the piston 24. To this end, the fixed member 44 is provided with a groove or recess 52 extending part way around its periphery and communicating with the hydraulic cell 50 through a plurality of restricted openings 54. A pump 56, preferably driven from the engine, supplies a suitable fluid under pressure into a passage 58 which extends through the housing 32 into communication with the groove 52. The fluid supplied by the pump 56 preferably comprises the engine lubricating oil and, if its pressure and capacity is sufficient, the pump 56 may comprise the engine lubricating oil pump.

The fixed member 44 is provided with one or more escape or bleed ports 60 for the fluid within the groove 52 and the seal ring 48 acts as a valve to control the extent to which the bleed ports 60 are uncovered. Thus, axial movement of the piston 24 to the right (Figure 1) uncovers the bleed port 60 thereby decreasing the fluid pressure in the groove 52 and consequently in the hydraulic cell 50. Similarly, axial movement of the piston 24 to the left (Figure 1) increases the extent to which the bleed ports 60 are covered thereby increasing the fluid pressure acting against the piston 24.

When torque is transmitted from the crankshaft 10 to the propeller shaft 12, the reaction torque on the gear 22 is transmitted to the housing 32 through the piston 24, the spherical balls 42 and the fixed member 30 secured to the housing 32. With torque on the sun gear 22, the resulting axial reaction between the balls 42 and the walls of their conical pockets causes axial movement of the piston 24 to the left (Figure 1) against the hydraulic pressure in the cell 50 and, at the same time, the piston 24 and gear 22 rotate slightly.

With this construction, any increase in the torque being transmitted causes axial movement of the piston 24 against the hydraulic pressure in the cell 50. This movement of the piston results in a closing adjustment of the bleed port 60 to increase the hydraulic pressure in the cell 50. Accordingly, the piston moves until the hydraulic pressure within the cell 50 increases sufficiently to again balance the axial force acting on the piston and resulting from the torque reaction on gear 22. Similarly, upon a decrease in the torque being transmitted, the hydraulic pressure within the cell 50 will move the piston 24 against the now smaller axial torque reaction thereby effecting an opening adjustment of the bleed ports 60 to reduce the hydraulic pressure within the cell 50. Accordingly, the piston 24 will move under the action of the hydraulic pressure acting thereon until the resulting reduction of the hydraulic pressure within the cell 50 is such that the hydraulic pressure again balances the axial torque reaction. In this way, the magnitude of the hydraulic pressure within the cell 50 is a measure of the engine torque being transmitted.

The pump 56 should have a capacity such that the pump is capable of providing an output pressure sufficient to balance the axial torque reaction on the piston 24 under maximum torque operating conditions. However, because of engine vibration or sudden changes in engine power, the axial torque reaction on the piston 24 may be sufficient to move the piston to the end of its stroke. Accordingly, a readily replaceable stop ring 62 is provided to limit the movement of the piston 24 in response to the axial torque reaction acting thereon. The ring 62 is subject to damage resulting from repeated engagement by the piston 24 and therefore is made replaceable. Also, by disposing the piston stop (ring 62) outside the chamber 50 the effective piston area is not reduced upon engagement with this stop.

The pressure within the hydraulic cell 50 is transmitted to a groove 64 in the fixed member 44 through a plurality of restricted openings 66. The groove 64 extends only part way around the member 44 and terminates short of the groove 52 as illustrated in Figure 4. The pressure gage 68 is connected in communication with the groove 64 by a passage 70 whereby the gage 68 measures the hydraulic pressure within the cell 50 and therefore measures the torque being transmitted by the shaft 10. The gage 68 may be calibrated so the torque can be read directly therefrom.

With the above construction, hydraulic pressure pulsations characteristic of the pump 56 have substantially no effect on the indication of the gage 68. Also, pressure fluctuations in the cell 50 resulting from engine vibration are substantially damped by the restricted passages 66. Furthermore, with the present construction, the bleed ports 60 are in direct communication with the groove 52 which, in turn, communicates with the hydraulic cell 50 through the restricted openings or passages 54. In this way, pressure variations in the groove 52 resulting from rapid changes in the rate of flow through the bleed port 60 are also damped by the restricted openings 54 before reaching the indicating gage 68. That is, the hydraulic torque meter of the present invention provides a simple construction whereby pressure pulsations characteristic of the pump, pressure fluctuations resulting from rapid changes in the flow through the pressure relief ports and pressure fluctuations resulting from transmission vibrations are isolated from the torque meter indicator gage.

The invention has been described in connection with a transmission between an aircraft engine and its propeller shaft. However, the invention is not limited to this specific application. Also, although the torque meter herein described is of the general type disclosed in the aforementioned Chilton patent, the invention obviously is equally applicable to other forms of hydraulic torque meters. Furthermore, the invention is not limited to torque measuring means and instead is generally applicable to hydraulic means for measuring the force on a piston member.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications.

I claim as my invention:

1. In combination, means providing a chamber, a piston-like member closing one end of said chamber and movable relatively thereto, a passage through which a fluid under pressure is adapted to be supplied, a restricted opening between said passage and chamber, a fluid bleed opening communicating with said passage on the side of said restricted opening remote from said chamber, means operative to exert a force on said piston-like member against the fluid pressure in said chamber, said piston-like member being movable by said force and the opposing force of the fluid pressure in said chamber to adjust the magnitude of said bleed opening, a fluid pressure responsive indicator, and a passage establishing communication between said indicator and said chamber on the chamber side of said restricted opening.

2. In combination, means providing a chamber, a piston-like member closing one end of said chamber and movable relatively thereto, a passage through which a fluid under pressure is adapted to be supplied, a restricted opening between said passage and chamber, a fluid bleed opening communicating with said passage on the side of said restricted opening remote from said chamber, means operative to exert a force on said piston-like member against the fluid pressure in said chamber, said piston-like member being movable by said force and the opposing force of the fluid pressure in said chamber to adjust the magnitude of said bleed opening, means outside said chamber providing a stop toward which said piston is urged by said force, a fluid pressure responsive indicator, and a passage establishing communication between said indicator and said chamber on the chamber side of said restricted opening.

3. In combination with means for transmitting torque, means providing a chamber, a piston-like member closing one end of said chamber and movable relatively thereto, a passage through which a fluid under pressure is adapted to be supplied, a restricted opening between said passage and chamber, a fluid bleed opening communicating with said passage on the side of said restricted opening remote from said chamber, means operative to urge said piston-like member against the fluid pressure in said chamber with a force proportional to the transmitted torque, said piston-like member being movable by said force and the opposing force of the fluid pressure in said chamber to control the magnitude of said bleed opening, a fluid pressure responsive indicator, and a passage establishing communication between said indicator and said chamber on the chamber side of said restricted opening.

4. In combination with a transmission, a torque-reaction member for said transmission, means providing a chamber, a piston-like member closing one end of said chamber and movable relatively thereto, a passage, a pump for supplying a fluid under pressure to said passage, a restricted opening establishing communication between said passage and chamber, a fluid bleed opening communicating with said passage on the side of said restricted opening remote from said chamber, means operatively connecting said piston-like member with said torque reaction member so that said piston-like member is urged against the fluid pressure in said chamber with a force proportional to the torque acting on said reaction member, said piston-like member being movable by said force and the opposing force of the fluid pressure in said chamber to control the magnitude of said bleed opening, a fluid pressure responsive indicator, and a passage establishing communication between said indicator and said chamber on the chamber side of said restricted opening.

PETER H. PALEN.

REFERENCES CITED

The following references are of record in the file of this patent:

UNITED STATES PATENTS

| Number | Name | Date |
| --- | --- | --- |
| 1,302,538 | Gulick | May 6, 1919 |
| 1,646,311 | Page | Oct. 18, 1927 |
| 1,972,054 | Moller | Aug. 28, 1934 |
| 2,117,800 | Harrison | May 17, 1938 |
| 2,233,498 | Taylor | Mar. 4, 1941 |
| 2,257,577 | Rosenberger | Sept. 30, 1941 |
| 2,262,022 | Lundquist et al. | Nov. 11, 1941 |
| 2,289,285 | Chilton | July 7, 1942 |
| 2,354,423 | Rosenberger | July 25, 1944 |
| 2,360,889 | Philbrick | Oct. 24, 1944 |

OTHER REFERENCES

"Chemical and Metallurgical Engineering" magazine, Issue of May 1943, pgs. 122, 123 and 124, 236-82 publications.

"Sales Engineering Dept., Technigram No. 81," pgs. 1 to 9. Published Dec. 1938 by Taylor Instrument Co., Rochester, N. Y.